Figure 1:
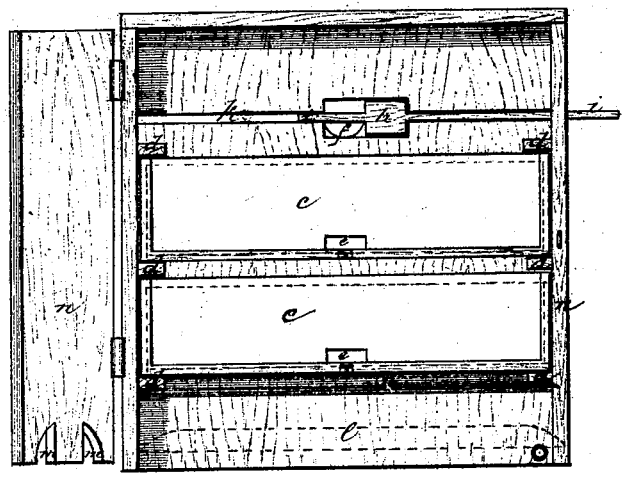

W. A. Ruth,
Bee Hive.
No. 109,672. Patented Nov. 29, 1870.

Witnesses
Wm. A. Ruth, Inventor
his Attorneys

United States Patent Office.

WILLIAM A. RUTH, OF WYOMING, DELAWARE.

Letters Patent No. 109,672, dated November 29, 1870.

IMPROVEMENT IN BEE-HIVES.

The Schedule referred to in these Letters Patent and making part of the same.

*To all whom it may concern:*

Be it known that I, WILLIAM A. RUTH, of Wyoming, in the county of Kent and State of Delaware, have invented a new and improved Bee-Hive; and I do hereby declare the following to be a full, clear, and exact description of the same, reference being had to the accompanying drawing making a part of this specification.

My invention relates to improvement in slides for closing the entrances of honey-boxes in bee-hives, and consists in the construction and arrangement of slides, as hereinafter fully explained, and as specified in the claim.

In the drawing—

Figure 2:
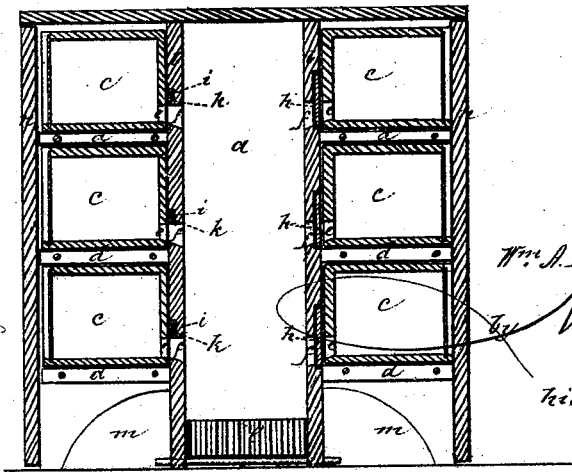

Figure 1 represents a side elevation of a hive provided with my improvement, the outer doors being open, and Figure 2, a vertical transverse section of the same.

*a* represents a central chamber.

*b b*, the partitions separating it from the honey-boxes *c c*, which are, in this instance, shown arranged one above another.

*h h* are my improved slides, which are fitted in grooves *k k*, and have stems *i i* projecting through the outer walls of the hive, so as to permit them to be easily and readily operated for closing the apertures *f f* in the partitions, which correspond with the openings *e e* in the boxes *c c*.

Thus bees may be shut off from honey-boxes when it is desired to remove one of the latter, or for other reasons, with entire safety and ease, and without alarm or injury to the bees themselves.

I am aware the invention of Aaron E. James, patented January 6, 1844, exhibits a device similar in some respects to mine, but I lay no claim to anything therein shown.

Having thus described my invention,

What I claim as new, and desire to secure by Letters Patent, is—

The slides *h h*, arranged in the grooves *k k* of the partitions *b b*, and provided with stems *i i* projecting outside the wall of the hive, as and for the purpose specified.

WILLIAM A. RUTH.

Witnesses:
 A. A. BAKER,
 H. C. GREEN.